(No Model.)

J. S. COOK.
SHAFT COUPLING.

No. 355,062. Patented Dec. 28, 1886.

WITNESSES
Ed. A. Newman.
C. M. Newman.

INVENTOR
Joseph S. Cook.
By his Attorneys
Baldwin, Hopkins & Peyton.

UNITED STATES PATENT OFFICE.

JOSEPH S. COOK, OF ATLANTA, GEORGIA.

SHAFT-COUPLING.

SPECIFICATION forming part of Letters Patent No. 355,062, dated December 28, 1886.

Application filed September 13, 1886. Serial No. 213,421. (No model.)

*To all whom it may concern:*

Be it known that I, JOSEPH S. COOK, of Atlanta, in the County of Fulton and State of Georgia, have invented certain new and useful Improvements in Shaft-Couplings, of which the following is a specification.

My object is to provide an improved coupling of the class adapted to clamp the adjacent ends of shafts independently and concentrically, whether the adjacent shaft ends be of exactly the same size or not, and at the same time to provide for easily and readily disconnecting the coupling when it is desired to remove any section or shaft of a line of shafting. To this end I make my coupling in two separate and distinct halves, each half consisting of a split cone-like hub and a sleeve, both provided with bolt-holes for clamping its shaft independently, the hubs and sleeves of the respective halves being directly and strongly connected by bolts, uniting the halves in such manner that when the bolts are tapped out the shafts are entirely disconnected.

In accordance with my improvements the respectively adjacent ends of the sections of lines of shafting are coupled together within and by split flanged cone-like hubs having cylindrical bores and tapered or conical exterior surfaces, the flanged cone-like hubs being compressed and clamped about the shafts by sleeves tapered on their inner surfaces to correspond with the taper of the outer surfaces of the hubs, and these sleeves being forcibly drawn upon and secured about the hubs and the hubs connected with each other by means of bolts passing through the hub-flanges as well as through the sleeves and nuts, each coupling complete, consisting of two flanged cone-like hubs and two clamping sleeves, together with the requisite bolts (any number desired) and keys or pins to prevent turning on the shafts.

The subject-matter deemed novel will be specifically designated by the claims, after describing my improvements by the aid of the accompanying drawings, in which—

Figure 1:
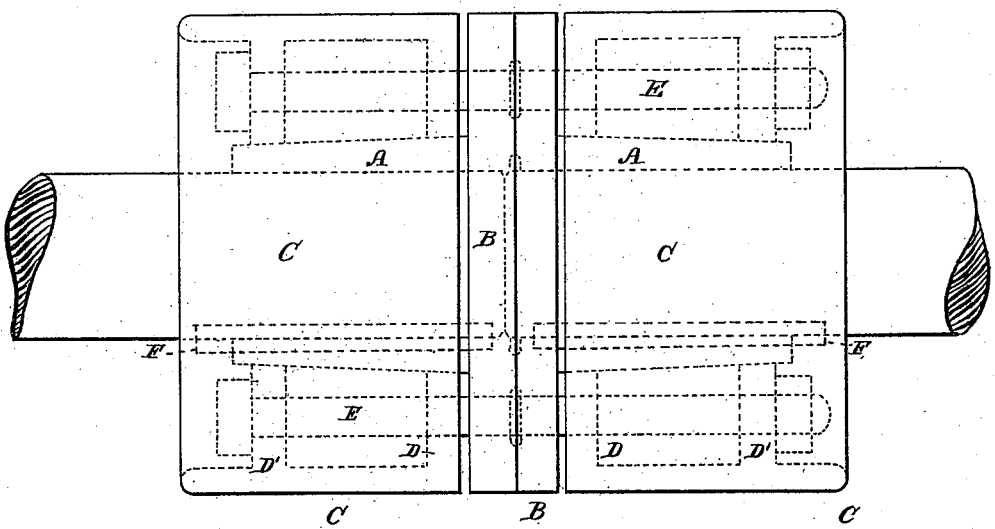
Figure 2:
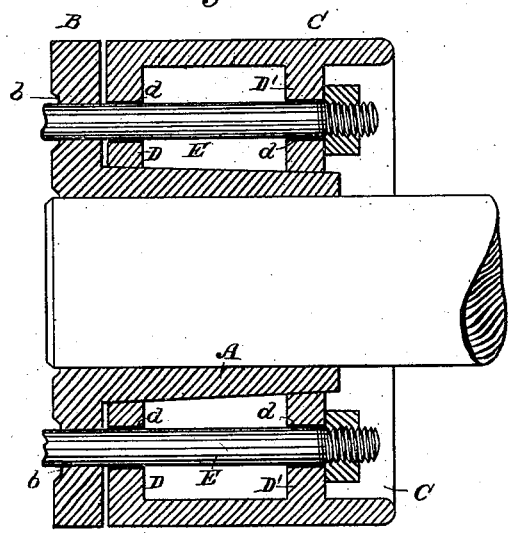

Figure 1 is a view in elevation, showing the coupling clamped upon the adjacent ends of two shafts; Fig. 2, a central longitudinal section, showing one-half of the coupling in its clamped position upon a shaft end, and Fig. 3 a view in elevation of one of the flanged cone-like hubs on the end of a shaft.

Figure 3:
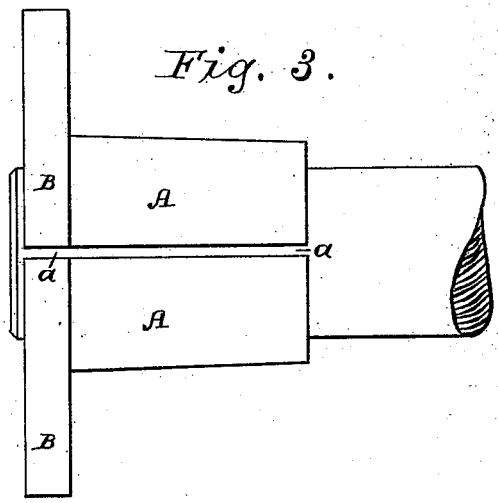

The two flanged cone-like hubs are each split by a longitudinal slot, $a$, Fig. 3. They are of similar construction, each consisting of the hub proper, A, with the flanged or annular head B, all of the same piece of iron or other metal. The object of slotting the flanges is, as well understood, to admit of the clamping of the flanged hub on the shafts when compressed by sleeves being drawn on the tapered hubs. The flanged hub is of cylindrical bore—that is to say, the hole for the shaft is of uniform diameter throughout its length. Exteriorly the hub tapers gradually and regularly from the annular head to the opposite end, as is plainly shown in the drawings. Each hub-flange is provided with holes $b$ corresponding in number with the number of securing-bolts used, in order that the hubs may be directly connected with each other, as soon to be explained.

The clamping-sleeves C are each of similar construction, and may be made solid or cored out to save weight of metal, with annular flanges or webs D D', as shown in the drawings. Whether solid or with annular flanges or webs, their internal surfaces or bores are inclined or tapered to correspond with the taper of the hubs.

Bolt-holes $d\ d$ are provided in the webs of the clamping-sleeves for the bolts E, in number as desired. The bolts pass loosely through these holes and neatly through the holes $b\ b$, provided in the annular heads or flanges of the hubs.

From the above description it will be seen that the coupling is divided into two corresponding sections, one for each of the adjacent ends of the shafts to be coupled, and the operation will be understood to be as follows: Key-seats having previously been made in the ends of the shafts to be coupled, and each flanged hub of the coupling having its keyway of corresponding width, each sleeve is put loosely on a hub, the hubs are slipped on the ends of the shafts to be coupled, so that the keyways come in line with the key-seats, the keys F are slipped in with the fingers; the ends of the shafts are now brought so that the bolt-holes are in line, the bolts are put in and the nuts tightened with a wrench until the shafts seem solid in the coupling. Instead of the key shown in the drawings a pin may be used, if desired.

To provide for the variation in the size of shafts, as it is almost impossible to turn two of exactly the same size, the compressing-sleeves are bored of such size that they will come about half-way between the small end of the hub and its annular head or flange to clamp firmly on a shaft of the exact size for which the coupling is intended. If the shaft is a little smaller, by tightening the nuts the sleeve will draw a little farther on the hub until the shaft is clamped, or if the shaft is a little large it will become tight in the coupling before the sleeve is drawn half-way.

It will be seen that an important feature of my invention, as compared with other devices of this class, is the manner in which the two halves of the coupling are connected, the connecting-bolts passing not only through the clamping-sleeves, but also through the cone-like hubs, thus making a direct and very strong connection between the hubs as well as between the sleeves.

What I claim as my own invention is—

1. The combination of the two similar split cone-like hubs directly and detachably connected with each other, and the two similar clamping-sleeves secured one about each of said hubs, directly and detachably connected with each other, substantially as and for the porpose set forth.

2. The combination of the two similar split cone-like hubs, the clamping-sleeves, and the securing-bolts passing through the clamping-sleeves and through the cone-like hubs, substantially as and for the purpose set forth.

In testimony whereof I have hereunto subscribed my name.

JOSEPH S. COOK.

Witnesses:
WM. T. PRICE,
SAM. PRICE.